UNITED STATES PATENT OFFICE.

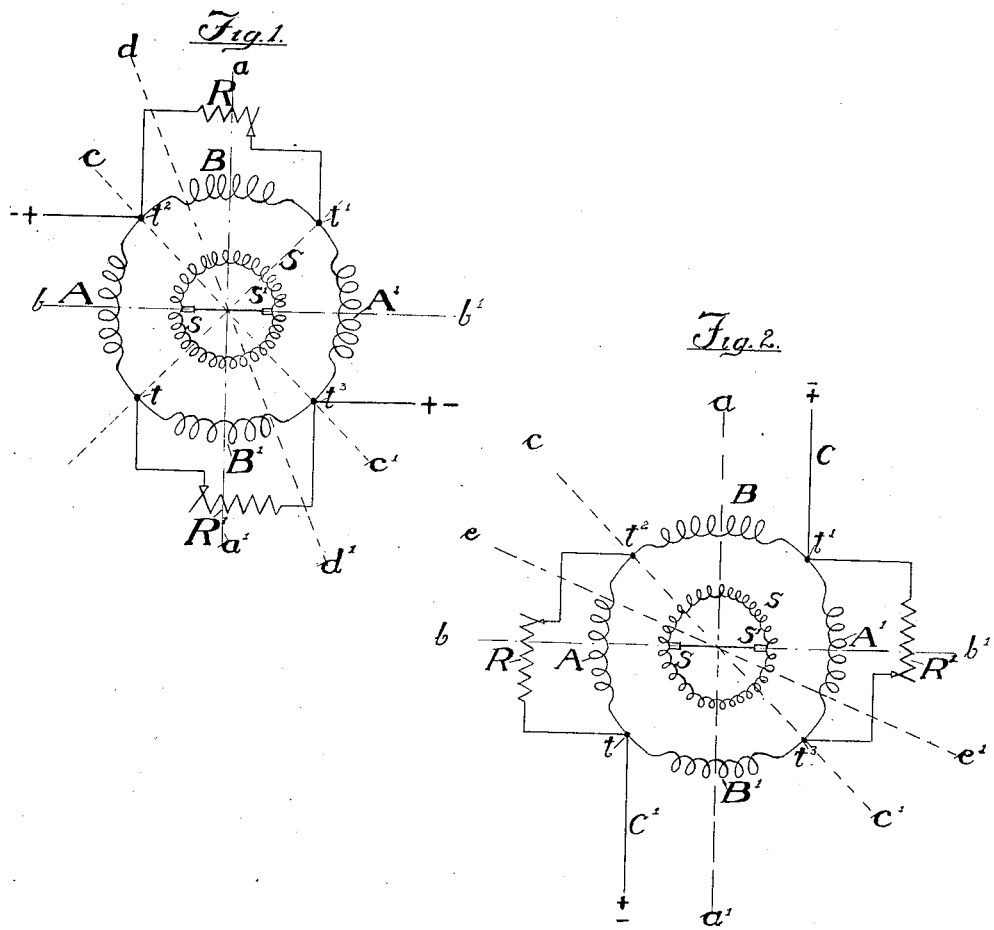

ARTHUR SIMON, OF MILWAUKEE, WISCONSIN.

REPULSION-MOTOR.

1,094,102.  Specification of Letters Patent.  Patented Apr. 21, 1914.

Application filed November 29, 1907. Serial No. 404,240½.

*To all whom it may concern:*

Be it known that I, ARTHUR SIMON, a subject of the Emperor of Germany, residing at Milwaukee, in the county of Milwaukee and State of Wisconsin, have invented new and useful Improvements in Repulsion-Motors, of which the following is a full, clear, concise and exact description, reference being had to the accompanying drawing, forming a part of this specification.

My invention relates to improvements in alternating current motors and applies especially to repulsion motors, as set forth in my original application, Serial No. 305,667, filed March 12, 1906.

It has for its object to provide certain improvements in means for controlling the speed of such motors.

In order to bring forth features of my invention, I shall briefly describe the construction and operation of a repulsion motor. Such a motor is provided with a primary winding and a secondary winding, the former being arranged upon the field or stator and connected to an alternating current circuit, and the latter being arranged upon the armature or rotor, and connected to a commutator upon which short-circuited or otherwise connected brushes bear. The primary winding creates a primary magnetic flux which causes the secondary winding to produce a secondary magnetic flux. These fluxes are so interlinked that the same produce a reactive or repulsive effect, which causes the armature or rotor to rotate. I shall hereinafter assume the conditions that prevail during the half cycle of the current so as to avoid any confusion that might arise in setting forth the general principle of my invention, if changes in conditions, due to alternations of the current, were considered. It will be understood that the speed of the motor depends upon the relative angular positions of the primary and secondary fluxes. Therefore, if the angular positions of these fluxes be changed relatively, the motor speed will be varied.

According to my invention, the primary winding is so formed that it tends to create magnetic fluxes having different angular positions. For convenience in setting forth my invention, I shall say that the primary winding has one coil, or set of coils, which tends to create a magnetic flux in one angular position, and another coil, or set of coils, which tends to create a magnetic flux in another angular position. Inasmuch as these fluxes are commingled, the same resolve into a single flux. The resultant flux which is thus produced assumes an angular position, which is intermediate of the positions its component fluxes tend to assume. The position of the resultant flux is dependent upon the relative magnetomotive forces of the two coils, or two sets of coils, or, from another standpoint, it is dependent upon the relative magnitude or intensity of its component fluxes. In order to vary the motor speed, I provide means to vary the magnetomotive force of one or the other or both of the coils or sets of coils, so as to change the angular position of the primary flux. The primary winding may assume various forms so long as it tends to produce magnetic flux having different angular positions. In practice, it is usually what is termed a continuous winding and is provided with four taps, arranged substantially equidistant apart. It may be said that the winding is thus divided into four parts or coils. These four coils may be considered as two pairs of coils, each pair including diametrically opposite coils. These pairs of coils tend to create magnetic fluxes, the positions of which are 90 degrees apart, but in fact a resultant flux is produced, which, if the magnitude of its component flux is equal, assumes a position of 45 degrees. In order that I may vary the relative magnetomotive force of the two pairs of coils, I connect a rheostat, or other means, to the taps of the primary winding.

It should be understood that, broadly, my invention, as applied to repulsion motors to accomplish the purposes already set forth, contemplates the provision of means whereby I create a magnetic flux which is the resultant of fluxes tending to have different angular positions. It further contemplates the provision of means whereby I may change the angular position of the resultant flux by varying the magnitude or intensities of its component fluxes.

In order to more particularly set forth my invention, I have diagrammatically illustrated one way in which the same may be applied in practice. It will, of course, be understood that the schemes which I have indicated may be modified according to conditions and that different means may be employed to attain the ends which I seek.

While I have diagrammatically illustrated a bipolar repulsion motor, it will be understood that my invention may be applied to a multipolar motor and other forms of alternating current motors.

Figures 1 and 2 are diagrams of a repulsion motor in which one form of my invention is embodied. Fig. 3 is a diagram indicating the resultant magnetic flux and its component fluxes. Figs. 4 and 5 are similar diagrams indicating in dotted lines changes in the component and the resultant fluxes to produce variations in the speed of the motor.

I shall first refer to Figs. 1 and 2, which diagrammatically illustrate the primary and secondary windings of a repulsion motor. In practice, the coils S of the secondary winding are suitably connected to a commutator which is engaged by brushes $s$—$s'$. These brushes are short-circuited or connected through a resistance. The position of the brushes upon the commutator determines the angular position of the secondary flux. As has been stated, the primary winding is preferably a continuous winding. It is provided with four taps or terminals, $t$, $t^1$, $t^2$ and $t^3$, equidistant apart, which in effect divide the four coils or sections into two pairs of coils $A$—$A^1$ and $B$—$B^1$, the coils $A$—$A^1$ forming one pair and the coils $B$—$B^1$ forming the other pair. The taps $t$—$t^1$ are connected to a single phase alternating current circuit. The coils A and B are arranged in series, as are also the coils $B^1$ and $A^1$, the coils A and B being arranged in parallel with the coils $A^1$ and $B^1$. To vary the relative magnetomotive force of the coils or sections of the primary winding, I provide rheostats or variable resistances $R$—$R^1$. Of course, I may employ other means for this purpose. If it be desired to have the coils $A$—$A^1$ predominate, the variable resistances $R$—$R^1$ are connected across the coils $B$—$B^1$, as in Fig. 1, and if it be desired to have the coils $B$—$B^1$ predominate, the variable resistances $R$—$R^1$ are connected across the coils $A$—$A^1$, as in Fig. 2. Of course, various means may be provided for connecting the variable resistances across either pair of coils, and, furthermore, if it be desired the variable resistances may be connected across each pair of coils, these things all being determined by the circumstances and the ends which it is desired to attain in practice. In order to understand my invention, however, it will simply be necessary to consider the means that are illustrated in the drawing. I shall first consider Fig. 1. During one-half cycle current from tap $t$ flows through coil A, thence dividingly through coil B, variable resistance R to the tap $t^1$. Likewise current flows from the tap $t$ dividingly through coil $B^1$ and variable resistance $R^1$, and thence through coil $A^1$ to the tap $t$.

During the other one-half cycle, current will flow through the coils and resistances in a reverse direction. It may be assumed that the coils $A$—$A^1$ tend to create a magnetic flux having the angular position and direction indicated by the dotted line $a$—$a^1$, and that the coils $B$—$B^1$ tend to create a magnetic flux having the angular position and direction indicated by the line $b$—$b^1$. These fluxes resolve into a single flux. It may be assumed that the resultant flux which is thus produced takes the angular position and direction indicated by the line $c$—$c^1$. The exact position of the resultant flux depends upon the relative magnitudes of its component fluxes. If, therefore, the fluxes $a$—$a^1$ and $b$—$b^1$ be varied relatively, the angular position of the resultant flux will be changed or shifted accordingly, thereby causing a variation in the speed of the motor. The relative magnitudes of the component fluxes $a$—$a^1$ and $b$—$b^1$ may be varied by means of the variable resistances $R$—$R^1$. Of course, it will be understood that other means may be employed to accomplish the required result. If the variable resistances $R$—$R^1$ across the coils $B$—$B^1$ be decreased, the magnitude or intensity of the fluxes $a$—$a^1$ will become greater than the magnitude or intensity of the fluxes $b$—$b^1$. The result will be that the resultant flux will be shifted to the position indicated by the line $d$—$d^1$. It may be assumed that such a change in the position of the resultant flux causes an increase in the speed of the motor.

I shall now refer to Fig. 2. During one-half cycle current flows from the tap $t$ dividing through variable resistance R, coil A, thence through coil B to tap $t^1$. Likewise, current flows through tap $t$, through coil $B^1$, thence dividingly through variable resistance $R^1$ and coil $A^1$ to tap $t$. During the other one-half cycle current will flow through the coils and variable resistances in a reverse direction. It may be assumed again that the resultant flux assumes the position and direction indicated by the dotted line $c$—$c^1$. If, now, the resistances $R$—$R^1$ be decreased, the magnitude of the flux $b$—$b^1$ will become greater than the magnitude of the flux $a$—$a^1$, and cause the position of the resultant flux to be shifted to the position indicated by the dotted line $e$—$e^1$. Inasmuch as the position of the resultant flux is thus shifted in an opposite direction from what it was in Fig. 1, the speed of the motor will be decreased. It will thus be seen that the position of the resultant flux $c$—$c^1$ may be shifted either toward the dotted line $d$—$d^1$ to increase the speed of the motor, or toward the dotted line $e$—$e^1$ to decrease the speed of the motor. Of course, it will be necessary to assume certain conditions herein in order to explain the nature of my invention.

It will be obvious that various mechanical devices may be adopted whereby the resistances R—R¹ across either pair of coils may be varied at will to regulate the speed of the motor.

Another way of considering my invention is that the primary winding tends to set up a magnetic flux having a certain angular position, and that the position of this flux is changed by varying the relative magnetomotive force of certain portions of the winding to vary directly the density of portions of the primary flux. In Figs. 3, 4 and 5 I have geometrically represented the resultant flux and its component fluxes. The lines of these figures are designated by the same letters as the fluxes to which the same correspond. The ordinate $a$—$a^1$ represents the position and magnitude of the flux of the coils A—A¹ and the abscissa $b$—$b^1$ represents the position and magnitude of the flux of the coils B—B¹. The vector $c$—$c^1$ represents the position and magnitude of the resultant flux when the fluxes $a$—$a^1$ and $b$—$b^1$ have such magnitudes as are indicated by full lines. In Fig. 4 the dotted vector $d$—$d^1$ represents the position and magnitude of the resultant flux if the magnitude of the flux $a$—$a^1$ be increased as compared with the flux $b$—$b^1$. In Fig. 5 the dotted vector $e$—$e^1$ represents the position and magnitude of the resultant flux, if the magnitude of the flux $b$—$b^1$ be increased as compared with the flux $a$—$a^1$.

It will, of course, be understood that my invention may be embodied in practice in various ways and still be within the purview of the claims appended hereto.

Having thus described my invention what I claim as new and desire to secure by Letters Patent, is:

1. In an alternating current motor in combination, a continuous closed and symmetrically distributed primary winding having a plurality of taps dividing said winding into a plurality of sections, certain of said sections being directly connected to a source of alternating current supply, and rheostatic means interposed between other of said sections and the supply circuit to vary the relative magnetomotive force of portions of said sections to vary directly the relative density of portions of the primary flux to shift the position of the resultant primary flux to vary the speed of the motor.

2. In a repulsion motor, in combination, a field or stator provided with two sets of windings forming in effect a single continuous closed winding, terminals of a single phase alternating current circuit, having said windings connected between the same, one winding of each set being connected in circuit in series with one winding of the other set, and one winding of each set being arranged in parallel with one winding of its own set and one winding of the other set, and a variable resistance shunt extending around each winding of one set.

3. In an alternating current motor, in combination, a primary winding, a secondary winding, said primary winding having taps connected to the terminals of a single phase alternating current circuit, and variable resistances connected between said taps and diametrically opposite points on said winding to vary directly the density of portions of the primary flux, to shift the position of the primary flux and thus vary the speed of the motor.

4. In an alternating current motor, in combination, a primary winding, a secondary winding, said primary winding having a plurality of taps, all connected externally to a single phase alternating current circuit, diametrically opposite taps being connected to different sides of the supply circuit, and variable resistances interposed between one set of diametrically opposite taps and the supply circuit for varying directly the density of portions of the primary flux to shift the position of the primary flux and thus vary the speed of the motor.

In witness whereof, I have hereunto subscribed my name in the presence of two witnesses.

ARTHUR SIMON.

Witnesses:
  MONTE R. FENNER,
  R. J. WICK.